Dec. 25, 1956　　　T. J. BOADWAY　　　2,775,349
INDUSTRIAL FILTER
Filed Aug. 18, 1953　　　　　　　　　　2 Sheets-Sheet 1
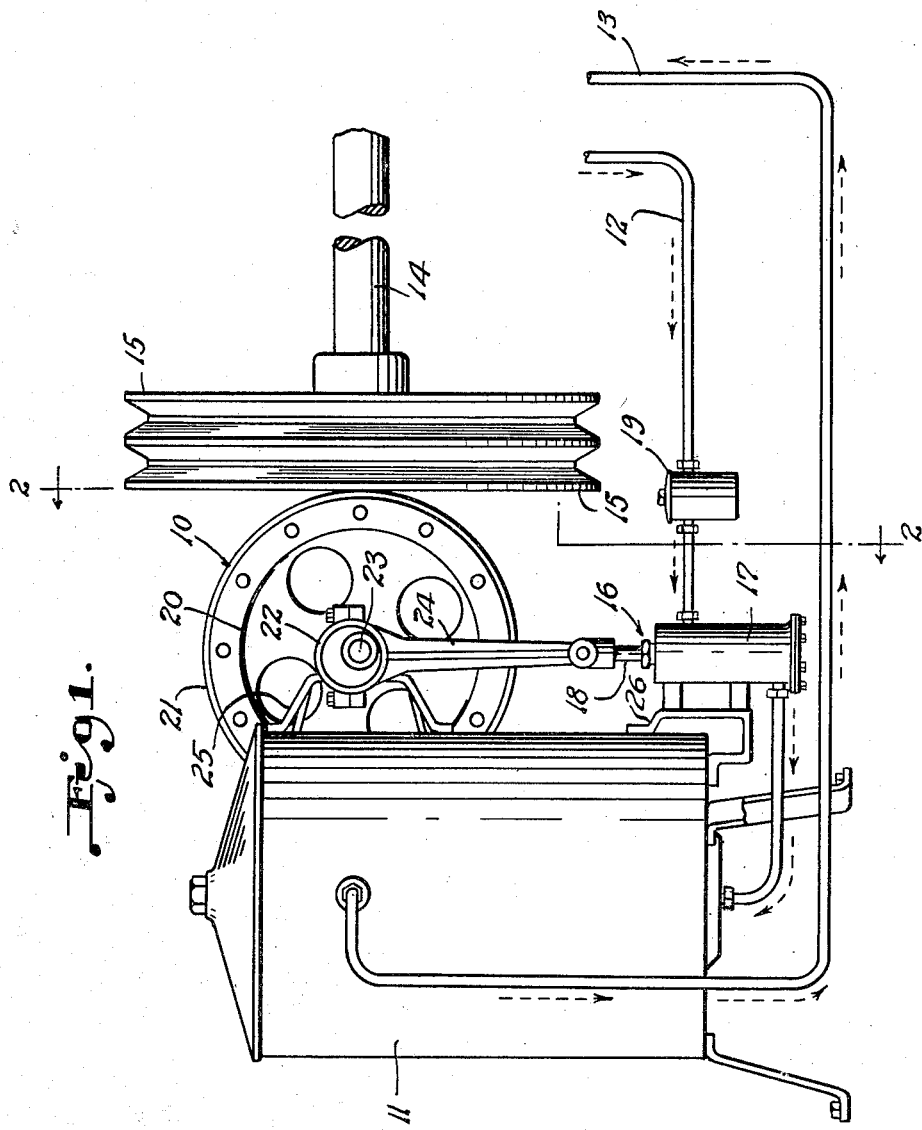
Thaddeus J. Boadway
INVENTOR
BY C. A. Snow & Co.
ATTORNEYS.

Dec. 25, 1956 T. J. BOADWAY 2,775,349
INDUSTRIAL FILTER
Filed Aug. 18, 1953 2 Sheets-Sheet 2
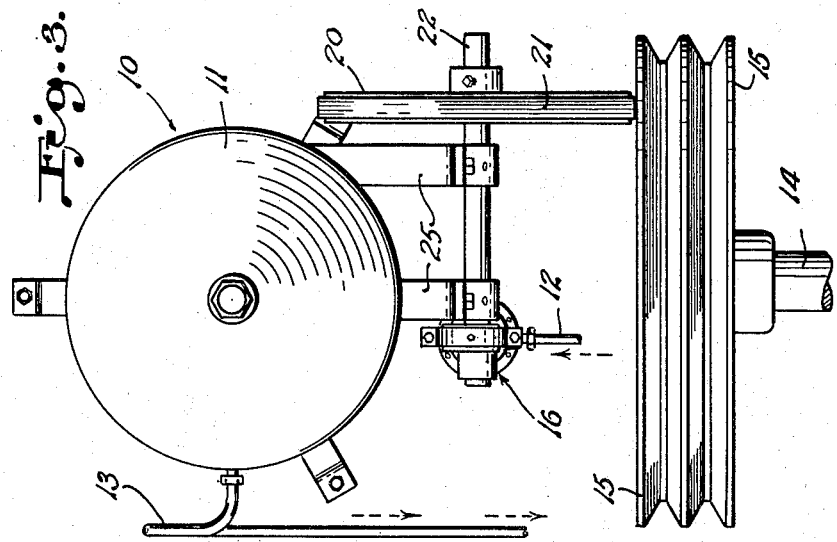
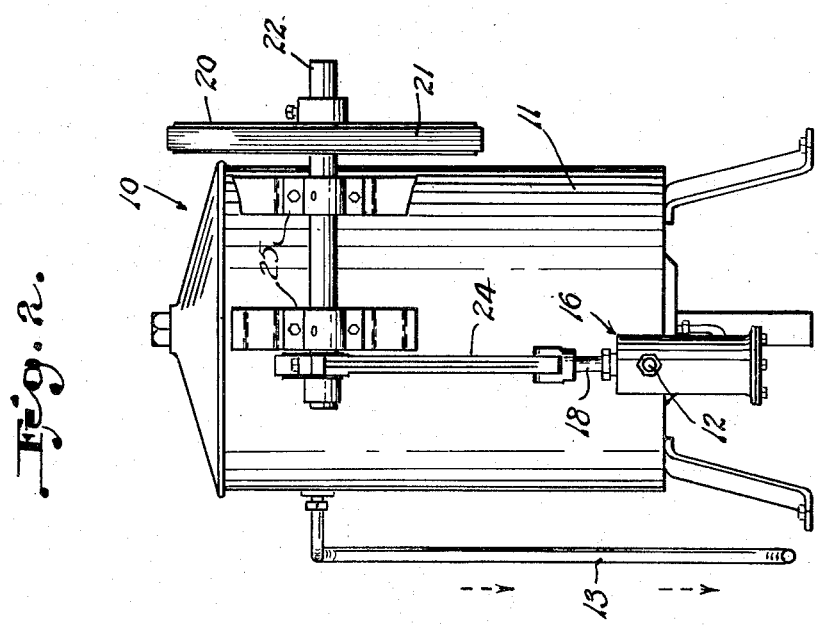
Thaddeus J. Boadway
INVENTOR
BY CA Snow & Co.
ATTORNEYS.

United States Patent Office 2,775,349
Patented Dec. 25, 1956

2,775,349

INDUSTRIAL FILTER

Thaddeus J. Boadway, Pampa, Tex.

Application August 18, 1953, Serial No. 374,893

1 Claim. (Cl. 210—150)

This invention relates to a filter and more particularly to a filter system for an industrial pumping mechanism as for a gear reducer on a pumping mechanism having a reservoir.

It is an object of this invention to provide a filter for an oil field pumping unit and the like where there is foreign matter accumulating in a reservoir and/or condenser of an oil field pump.

It is another object of this invention to provide a filter of this kind having a magnetic chamber for removing magnetizable metal particles from an oil line for a pump system and having a wool packed filter to remove other particles suspended in the oil before the oil is returned to the main oil reservoir or condenser for the oil pumping mechanism.

It is a further object of this invention to provide a filter mechanism for a drive mechanism of an oil-field pumping unit or the like when the filter includes an oil pump, a magnetic metal separator and a packed filter to remove all foreign matter from the oil in the oil-field pump and gear mechanism.

It is another object of this invention to remove all foreign particles from an oil system of an oil-field pumping unit and preventing the excessive wear on gears and bearings submerged in oil thereby prolonging the useful life of the oil-field pump by returning clean oil to the reservoir of the oil-field pump.

Other and further objects and advantages of this invention will be hereinafter described and the novel features thereof defined in the appended claim.

In the drawings:

Figure 1 is a side elevation of a filter mechanism constructed according to an embodiment of this invention.

Fig. 2 is a transverse section taken on the line 2—2 of Fig. 1.

Fig. 3 is a top plan view.

Referring to the drawings, the numeral 10 designates generally the filter mechanism for an oil-field pump, not shown in the drawings, or for other industrial pumping devices for a field pump having powered pumping mechanism and lubrication devices for the pumping mechanism. As a general rule the lubricating oil for the pumping or driving mechanism will accumulate metal particles and other particles which should be filtered from the lubrication of the power operating means. The industrial filter 10 of this invention is particularly associated with a well pump but it is to be recognized that the industrial filter of this invention may be just as readily used with other outdoor pump mechanisms or other devices requiring a filter for the lubricating means of the device.

The industrial device 10 includes a filter chamber 11 for containing heavy wool-packed filter material and the lubricating oil for the oil-field pumping unit, not shown in the drawings, or reducers for the oil-field pumping unit are to be passed through the filter medium contained within the chamber 11. The oil filter chamber 11 is connected to the oil-field pump by pipes 12 and 13 which are connected at one end to the reservoir of the oil field pump mechanism and at the other end to the filter 11.

The oil field pumping unit with which the filter unit 10 is adapted to be engaged may include a rotating drive shaft 14 having sheaves 15 fixed on one end thereof. A lubricating pump 16 is supported adjacent to the oil-field pump (not shown) of which the shaft 14 is a unit part.

The lubricating oil pump 16 is provided with a casing 17 having a reciprocating piston therein of which the numeral 18 indicates the piston rod extending outwardly from the casing 17 and operatively connected to the shaft 14. The pump 16 is adapted to circulate lubricating oil from its associated bearings or other friction surfaces through the filter chamber 11 and moving the lubricating oil back to the oil field pump not shown in the drawings.

A magnetic chamber 19 is connected intermediate the length of one of the lubricating fuel lines, as the lubricating fuel line 12, spaced from the field oil well. The internal structure of the magnetic chamber 19 is not shown in the drawings, but it is to be understood that the magnetic chamber 19 is provided with magnetic attracting means for moving the magnetically susceptible metal particles from the lubricating oil line 12 as the oil line 12 may introduce lubricating oil into one side of the chamber 19.

The lubricating pump 16 is operatively connected to one of the sheaves 15 by a driven wheel 20, the driven wheel 20 being provided with a rubberized or other friction surface 21 engaging the flat outer side of one of the sheaves 15 whereby rotation of the shaft 14 will effect the pumping movement of the piston within the lubricating pump 16 and the piston rod 18. The driven wheel 20 is rotatably supported on a bearing shaft 22 and an eccentric piston pin 23 is mounted within the center of the drive wheel 20 and operatively connected to one end of the piston shaft 18 by the pitman 24 as clearly shown in the drawings. Upon rotation of the sheaves 15 the driven wheel 20 will be rotated and the bearing shaft 22 together with the eccentric pin 23 for operating the lubricating oil piston 16. Upon the first movement of the piston 16 a suction will be caused in the lubricating line 12 for drawing lubricating fluid in the line 12 from the reservoir, or source of lubricating fluid supply, in the direction indicated by the arrows of the drawings. The shaft 22 is rotatably carried by a pair of upper brackets 25 fixed to chamber 11, and oil pump 16 is carried by a lower bracket 26 also fixed to chamber 11. Suitable check valves, not shown in the drawings, will be placed in the lubricating lines 12 and 13 to insure that the lubricating fluid will flow in the direction of the arrows.

When the oil field well pump is in operation, the industrial filter 10 will also be in operation for filtering the lubricating oil in the oil lines 12 and 13. As the pump shaft 14 is caused to rotate, the lubricating oil pump 16 will move the lubricating oil from the lubricating means or reservoir, not shown in the drawings, in the direction as shown in Fig. 1 of the drawings. The lubricating oil will first be introduced into the magnetic chamber 19 and then into the casing 17 of the lubricating oil pump 16 whence it will be moved by pressure of the pump 16 into the filter medium of the filter chamber 11. The lubricating oil will then be forced from the filter chamber 11 back out through the lubricating oil line 13 to the lubricating oil reservoir, not shown in the drawings, or to the bearings and other friction surfaces serviced by the lubricating fluid in the lubricating line 13.

While one of the purposes of this invention is to filter oil from the reservoir in the gear reducer on oil-field pumping units where there is considerable foreign matter accumulated in the reservoir as well as excessive condensation, this type of filter may also be used on other types of industrial equipment.

While the specific details of one embodiment of this invention have been herein shown and described, the invention is not confined thereto as changes and alterations may be made without departing from the spirit and scope thereof as defined in the appended claim.

I claim:

A filter unit for interposing in a lubricating system and for operation from a grooved pulley connected with a drive shaft, said unit comprising an upright filter having a lower intake and an upper outlet, a lower bracket fixed to said filter and projecting laterally therefrom, an upright reciprocating pump fixed to said bracket, a piston rod extending from the upper end of said pump, a pipe connecting the outlet of said pump with said lower intake, an upper bracket fixed to said filter, a crankshaft bearing carried by said upper bracket, a crankshaft journaled in said bearing, a pitman connected between said crankshaft and said piston rod, a driven wheel fixed on said crankshaft disposed at right angles to the adjacent face of said pulley for frictional contact with said pulley, and an outlet pipe connected to said upper outlet.

References Cited in the file of this patent
UNITED STATES PATENTS

| | | |
|---|---|---|
| 595,850 | Flickinger | Dec. 21, 1897 |
| 1,831,075 | Neeley | Nov. 10, 1931 |
| 2,127,474 | Smith | Aug. 16, 1938 |
| 2,392,624 | Tunis | Jan. 8, 1946 |
| 2,498,725 | Schutte | Apr. 16, 1946 |
| 2,570,131 | Koupal | Oct. 2, 1951 |